(12) United States Patent
Arai

(10) Patent No.: US 6,781,751 B2
(45) Date of Patent: Aug. 24, 2004

(54) SCANNING LASER MICROSCOPE

(75) Inventor: Yujin Arai, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/737,257

(22) Filed: Dec. 15, 2003

(65) Prior Publication Data

US 2004/0125440 A1 Jul. 1, 2004

Related U.S. Application Data

(62) Division of application No. 10/002,462, filed on Oct. 26, 2001, now Pat. No. 6,717,723.

(30) Foreign Application Priority Data

Oct. 30, 2000 (JP) .................................. 2000-330710

(51) Int. Cl.[7] .............................................. G02B 21/00
(52) U.S. Cl. ........................ 359/368; 359/202; 359/385
(58) Field of Search .............................. 359/363, 368, 359/385, 388, 389, 202

(56) References Cited

U.S. PATENT DOCUMENTS 5,028,802 A  *  7/1991  Webb et al. ................. 250/235
5,621,532 A       4/1997  Ooki et al.
5,932,871 A       8/1999  Nakagawa et al.
6,399,935 B1 *   6/2002  Jovin et al. .................. 250/216

FOREIGN PATENT DOCUMENTS

JP       9-189864 A    7/1997
JP    2000-035400 A    2/2000

\* cited by examiner

*Primary Examiner*—Mark A. Robinson
(74) *Attorney, Agent, or Firm*—Frishauf, Holtz, Goodman & Chick, P.C.

(57) ABSTRACT

A scanning laser microscope includes a laser generation unit which generates a laser beam, a light modulation unit which modulates the laser beam, a scanning unit which scans a sample, a light receiving unit which receives a light from the sample, a control unit which controls the light modulation unit for each pixel of a scanning image acquired by the light receiving of the light receiving unit, and a storage unit which stores a plurality of controlled patterns. The number of pixels of the patterns correspond to the number of pixels of the scanned image. A modulation information of the laser beam is set for each pixel. The control unit reads the control patterns stored in the storage unit, controls the light modulation unit based on the modulation information of each pixel, and performs such control that the control patterns are changed at an arbitrary timing.

1 Claim, 4 Drawing Sheets

SCANNING LASER MICROSCOPE

CROSS-REFERENCE TO RELATED APPLICATIONS

The present application is a Divisional of U.S. application Ser. No. 10/002,462, filed Oct. 26, 2001 now U.S. Pat. No. 6,717,723, which is based upon and claims the benefit of priority from the prior Japanese Patent Application No. 2000-330710, filed Oct. 30, 2000, the entire contents of which are incorporated herein by reference.

BACKGROUND OF THE INVENTION

1. Field of the Invention

The present invention relates to a scanning laser microscope used to observe a biological sample and the like.

2. Description of the Prior Art

A scanning laser microscope is known as a microscope which optically slices a sample of a living cell or tissue without damaging the sample to obtain a plurality of two-dimensional tomograms and which obtains a three-dimensional image from a plurality of two-dimensional tomograms.

The scanning laser microscope is popularly used by making the above characteristic features efficient. In the fields of physiology, pharmacology, cell biology, and the like, a chemical or physical reaction and the manner of a change in a cell with respect to a stimulus or heat to the cell, e.g., a stimulus caused by an electric signal or a chemical stimulus caused by a drug or medicine are observed and recorded in detail. In the fields of morphology and embryology, the structure and shape of a cell or the manners of modification and movement with time are observed and recorded in detail.

The scanning laser microscope which observes a biological sample, a fluorescent reagent or a fluorescent protein which is introduced into the sample is excited by a laser beam, and an intensity of fluorescence generated by the excitation is measured to create an image. In this case, it is known that an intensity of fluorescence generated from a fluorescent material decreases with irradiation of the excitation light, i.e., a photo bleaching occurs. For this reason, a method which cuts unnecessary excitation light to prevent the sample from being bleached (faded) as much as possible is considered.

For example, variations per unit time of the two-dimensional or three-dimensional image is observed, a method which prevents a laser beam from unnecessarily being irradiated on a sample within an interval time from acquisition of an image to acquisition of the next image is employed. As this method, a shutter on an optical path is mechanically opened or closed, a laser beam is attenuated by using an optical filter or an acousto-optic filter, or output of a laser beam source is electrically switched on or off.

On the basis of these thoughts, in a microscope disclosed in Jpn. Pat. Appln. KOKAI Publication No. 9-189864, a region to be observed is set in an image of one frame, and a laser beam actually scans the region. In this case, irradiation of the laser beam is controlled in units of scanning pixels such that a transmission state "1" and a transmission state "0" are set in the set region and outside the set region, respectively. In this manner, a sample outside the region to be observed is prevented from being bleached. In an inspection method disclosed in Jpn. Pat. Appln. KOKAI Publication No. 2000-35400, while a laser scans a two-dimensional plane, intensity adjustment of the laser beam and selection of a wavelength are executed at respective positions by a preset procedure. In this manner, a laser beam having a desired wavelength and a desired intensity can be irradiated on a desired portion in the two-dimensional plane.

In recent years, a study in which a fluorescent bleaching phenomenon is positively used is developed. In this study, a specific region of a sample is bleached by irradiation of a laser beam. Thereafter, the movement, the diffusion coefficient, and the like of a fluorescent material in a restoring process of fluorescence in the bleached region are measured while a an observed region or irradiation conditions of the laser beam are changing. More specifically, immediately after a specific portion of a sample is bleached in an arbitrary shape, a measurement is performed such that a laser beam having a desired wavelength and a desired intensity is irradiated on the specific portion, a region around the specific portion, or both the regions.

However, in the Jpn. Pat. Appln. KOKAI Publication No. 9-189864 and the Jpn. Pat. Appln. KOKAI Publication No. 2000-35400, irradiation of the laser beam is controlled in a preset region and respective positions on the basis of determined conditions, and static observation is set as a main object. For this reason, as described above, the conventional methods cannot cope with a dynamic measurement with the passage of time which, after bleaching a specific region of a sample by irradiation of a laser beam, measures a restoring process of fluorescence of the bleached region while an observed region or irradiation conditions of the laser beam are changed.

BRIEF SUMMARY OF THE INVENTION

It is an object of the present invention to provide a scanning laser microscope which can cope with a dynamic measurement with the passage of time.

According to the present invention, there is provided a scanning laser microscope including a laser generation unit which generates a laser beam, a light modulation unit which modulates the laser beam, a scanning unit which causes the laser beam to scan a sample, a light receiving unit which receives light from the sample, a control unit which controls the light modulation unit for each pixel of a scanning image acquired by light receiving of the light receiving unit, and a storage unit which stores a plurality of controlled patterns, the number of pixels of the patterns corresponding to the number of pixels of the scanning image, and in which modulation information of the laser beam is set for each pixel, wherein the control unit reads the control patterns stored in the storage unit, controls the light modulation unit on the basis of the modulation information of each pixel, and performs such control that the control patterns are changed at an arbitrary timing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings.

Figure 1:
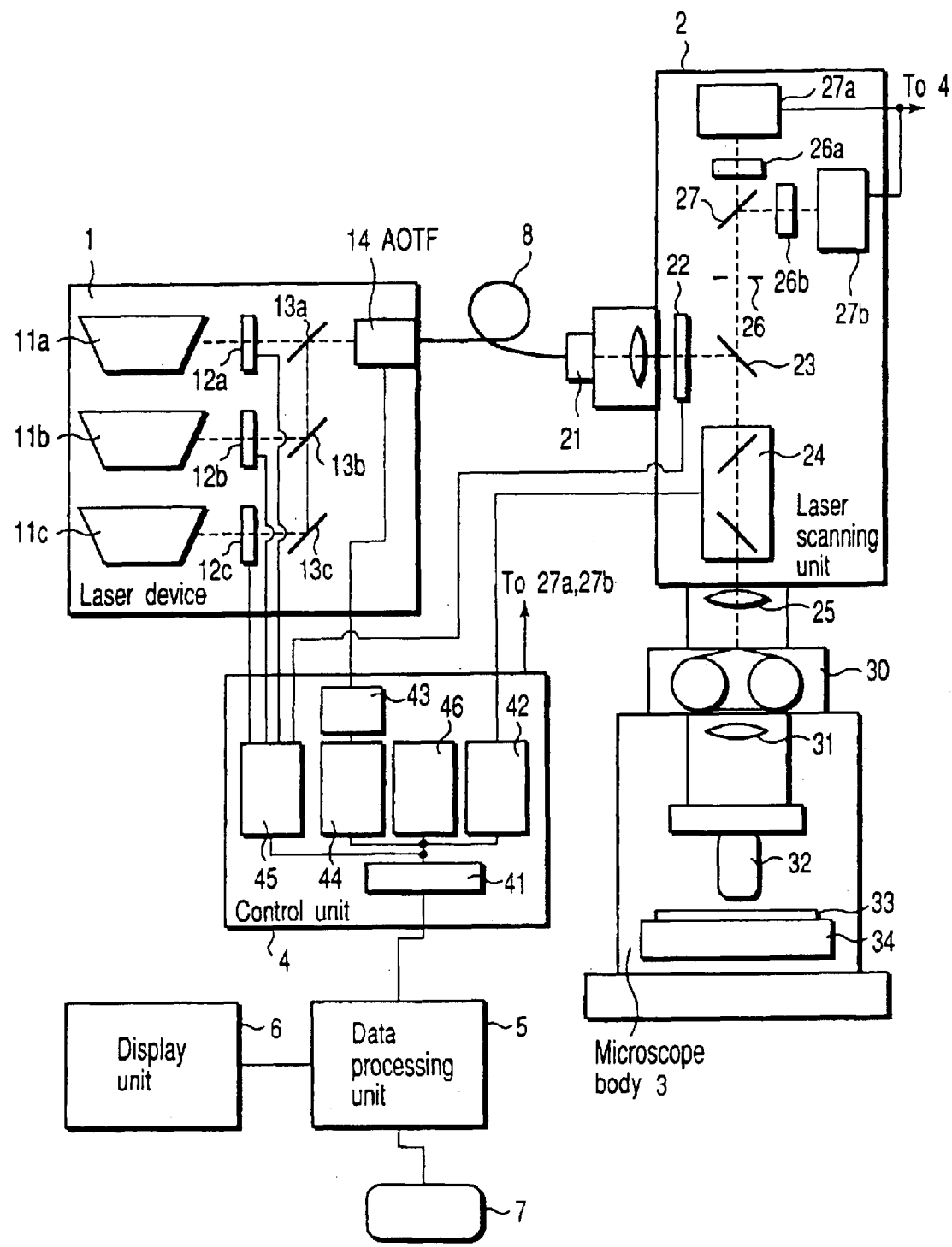
FIG. 1 is a schematic block diagram showing a configuration of a scanning laser microscope according to an embodiment of the present invention.

FIG. 1 is a schematic block diagram showing the configuration of a scanning laser microscope according to the first embodiment of the present invention. The scanning laser microscope is configured by a laser device 1, a laser scanning unit 2, a microscope body 3, a control unit 4, a data processing unit 5, a display unit 6, and an input unit 7.

The laser device 1 has a plurality (three in FIG. 1) of laser resonators 11a, 11b, and 11c having different wavelengths. On the front sides of the laser resonators 11a, 11b, and 11c, laser shutters 12a, 12b, and 12c for mechanically cutting laser optical paths are arranged, and dichroic mirrors 13a, 13b, and 13c for uniting the respective laser optical paths of the laser resonators 11a, 11b, and 11c to guide the laser optical paths to one laser optical path are arranged. On the laser optical path guided by the dichroic mirrors 13a, 13b, and 13c, an acoustic optical tunable filter (to be referred to as an AOTF hereinafter) 14 for modulating the wavelength and intensity of the laser beam is arranged. The laser shutters 12a, 12b, and 12c are arranged to avoid about 0.1% of a laser beam input to the acoustic optical tunable filter (to be referred to as an AOTF hereinafter) 14 from being always output because it is difficult to completely cut a laser beam due to the characteristics of the acoustic optical tunable filter 14.

A laser beam modulated by the AOTF 14 is input to a collimator lens 21 of the laser scanning unit 2 through an optical fiber 8. On the optical path of the laser beam collimated by the collimator lens 21, a dichroic mirror 23 is arranged through a laser shutter 22. The dichroic mirror 23 reflects the laser beam and transmit fluorescence light or reflected light from a sample 33 (to be described later). A scanning mechanism 24 and a projection lens 25 are arranged on the reflection optical path of the dichroic mirror 23. The scanning mechanism 24 causes the laser beam to two-dimensionally scan the sample 33, and the laser beam which two-dimensionally scans the sample 33 is incident on the microscope body 3 through the projection lens 25.

On the transmitted optical path of the dichroic mirror 23, a pin hole 26 and a dichroic mirror 27 are arranged. The pin hole 26 is arranged at a position which is optically conjugated with the sample 33. The dichroic mirror 27 divides the optical path of a signal light component of fluorescence light or reflected light into wavelength areas. On the optical paths divided by the dichroic mirror 27, photoelectric converters 27a and 27b are arranged through wavelength filters 26a and 26b. The wavelength filters 26a and 26b select the wavelengths of signal light components input through the dichroic mirror 27 at a high accuracy. The photoelectric converters 27a and 27b convert the signal light components in predetermined wavelength areas selected by the wavelength filters 26a and 26b into electric signals. The laser scanning unit 2 configured as described above is mechanically, electrically coupled with the observation tube of the microscope body 3.

In the microscope body 3, a binocular 30, a focusing lens 31, and an objective lens 32 are arranged along the reflection optical path of the dichroic mirror 23 of the laser scanning unit 2. The laser beam used in the two-dimensional scanning by the scanning mechanism 24 is irradiated on the sample 33 through the binocular 30, the focusing lens 31, and the objective lens 32. The sample 33 are mounted on a sample stage 34. In the sample 33, e.g., a fluorescent dye or a fluorescent protein introduced into the sample 33 is excited by irradiation of the laser beam, fluorescence light or reflected light having an intensity which is correlated to the concentration distribution of the fluorescent dye or the fluorescent protein is generated. The fluorescence light or the reflected light is sent to the laser scanning unit 2 through the objective lens 32, the focusing lens 31, and the binocular 30, and is incident on the dichroic mirror 23 through the projection lens 25 and the scanning mechanism 24.

The control unit 4 is configured by an interface unit 41, a scanner drive circuit 42, a high-frequency driver circuit 43, a control circuit 44, a electric part control circuit 45, and a synchronous signal generation circuit 46. The interface unit 41 exchanges data with the data processing unit 5. The scanner drive circuit 42 drives the scanning mechanism 24 of the laser scanning unit 2. The high-frequency driver circuit 43 drives the AOTF 14 of the laser device 1 performs intensity modulation of a laser beam from the AOTF 14 by a modulation signal from the control circuit 44. The electric part control circuit 45 controls the laser shutters 12a, 12b, 12c, and 22 and sets the detection sensitivities of the photoelectric converters 27a and 27b. The synchronous signal generation circuit 46 generates synchronous signals for the horizontal direction, the vertical direction, and the respective pixels of the scanning image.

The data processing unit 5 is configured by a personal computer, and supplies various control parameters and control signals to the control unit 4 through the interface unit 41. The display unit 6 is connected to the data processing unit 5, and displays a fluorescence light image or a reflected light image of the sample 33. The input unit 7 is configured by a mouse, a keyboard, or the like, and is connected to the data processing unit 5.

Figure 2:
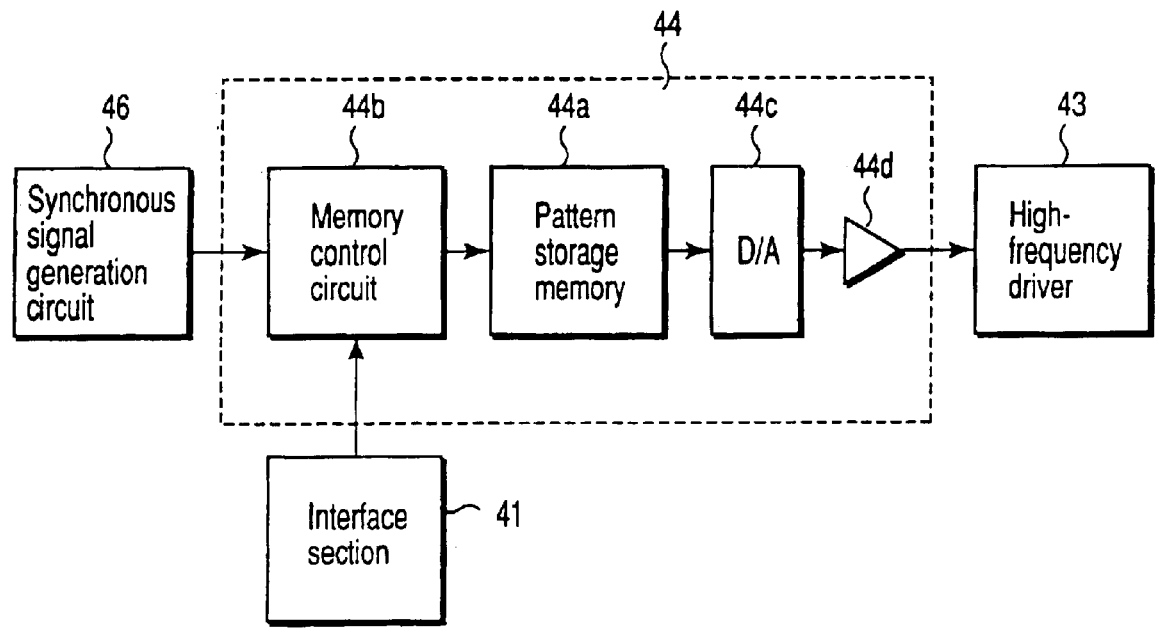
FIG. 2 is a block diagram showing a partial configuration of a control circuit according to the embodiment of the present invention.

FIG. 2 is a block diagram showing a partial configuration of the control circuit 44. As shown in FIG. 2, the control circuit 44 is configured by a pattern storage memory 44a, a memory control circuit 44b, a D/A converter 44c, a buffer amplifier 44d, and the like to control the high-frequency driver circuit 43. The pattern storage memory 44a stores the data of the pattern image of a laser beam irradiation region together with the information of irradiation intensities of the laser beams of the respective pixels. The memory control circuit 44b controls the pattern storage memory 44a by a synchronous signal supplied from the synchronous signal generation circuit 46 and control parameters given by the data processing unit 5 through the interface unit 41. The D/A converter 44c converts digital data read from the pattern storage memory 44a into an analog signal. The buffer amplifier 44d outputs an output from the D/A converter 44c to the high-frequency driver circuit 43 as an intensity modulation signal of a laser beam.

The operation of the scanning laser microscope configured as described above.

Laser beams generated by the laser resonators 11a, 11b, and 11c of the laser device 1 are adjusted in intensities for each wavelength and supplied to the laser scanning unit 2 through the optical fiber 8. The laser beam emitted from the optical fiber 8 is collimated by the collimator lens 21, reflected by the dichroic mirror 23, and guided to the scanning mechanism 24. A laser beam used in two-dimensional scanning by the scanning mechanism 24 is irradiated on the sample 33 through the binocular 30, the focusing lens 31, and the objective lens 32 which are included in the microscope body 3.

Fluorescence light or reflected light is generated from the sample 33 by irradiation of the laser beam, the fluorescence light or the reflected light is sent to the laser scanning unit 2 through the objective lens 32, the focusing lens 31, and the binocular 30 again, guided to the dichroic mirror 23 through the projection lens 25 and the scanning mechanism 24, and transmitted through the dichroic mirror 23. The information of only the focusing surface of the sample 33 is selectively passed by the pin hole 26 and divided by the dichroic mirror 27 into optical paths of wavelength areas. The divided light components are guided to the photoelectric converters 27a and 27b through the wavelength filters 26a and 26b, respectively, and are converted into electric signals depending on the intensities of the light components. The electric signals from the photoelectric converters 27a and 27b which are varied with the passage of time are A/D-converted in synchronism with scanning in the scanning mechanism 24, received by the control unit 4, sent to the data processing unit 5 through the interface unit 41, and displayed on the display unit 6 as a fluorescence light image or a reflected light image of the sample 33.

Figure 3:
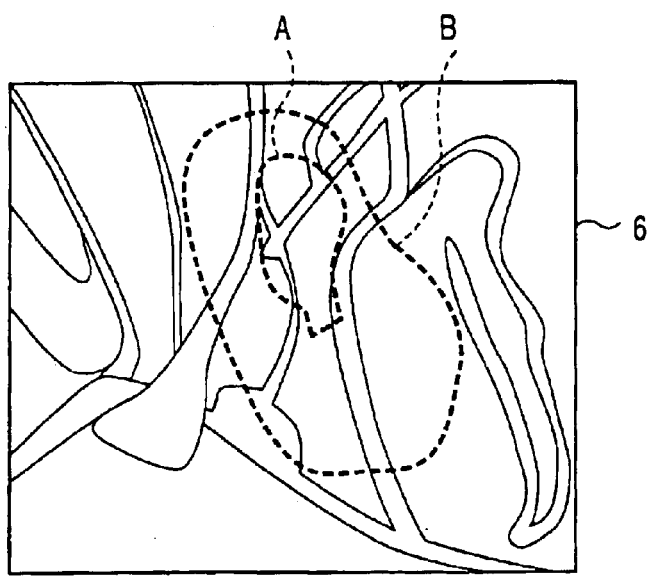
FIG. 3 is an illustration showing a scanning image displayed on a display unit according to the embodiment of the present invention.

FIG. 3 is an illustration showing a scanning image displayed on a display unit 6. As shown in FIG. 3, the image displayed on the display unit 6 is a scanning image showing the distribution of the intensity of fluorescence light or the intensity of reflected light in a region on the sample 33 two-dimensional scanned by the laser beam.

A procedure which, on the basis of the scanning image obtained on the display unit 6 described above, sets an arbitrary region on which the laser beam is irradiated and changes the irradiation region of the laser beam with time will be described below.

An operator designates a laser irradiation region A on the image by using the mouse of the input unit 7 with reference to the scanning image displayed on the display unit 6 shown in FIG. 3.

Figure 4:
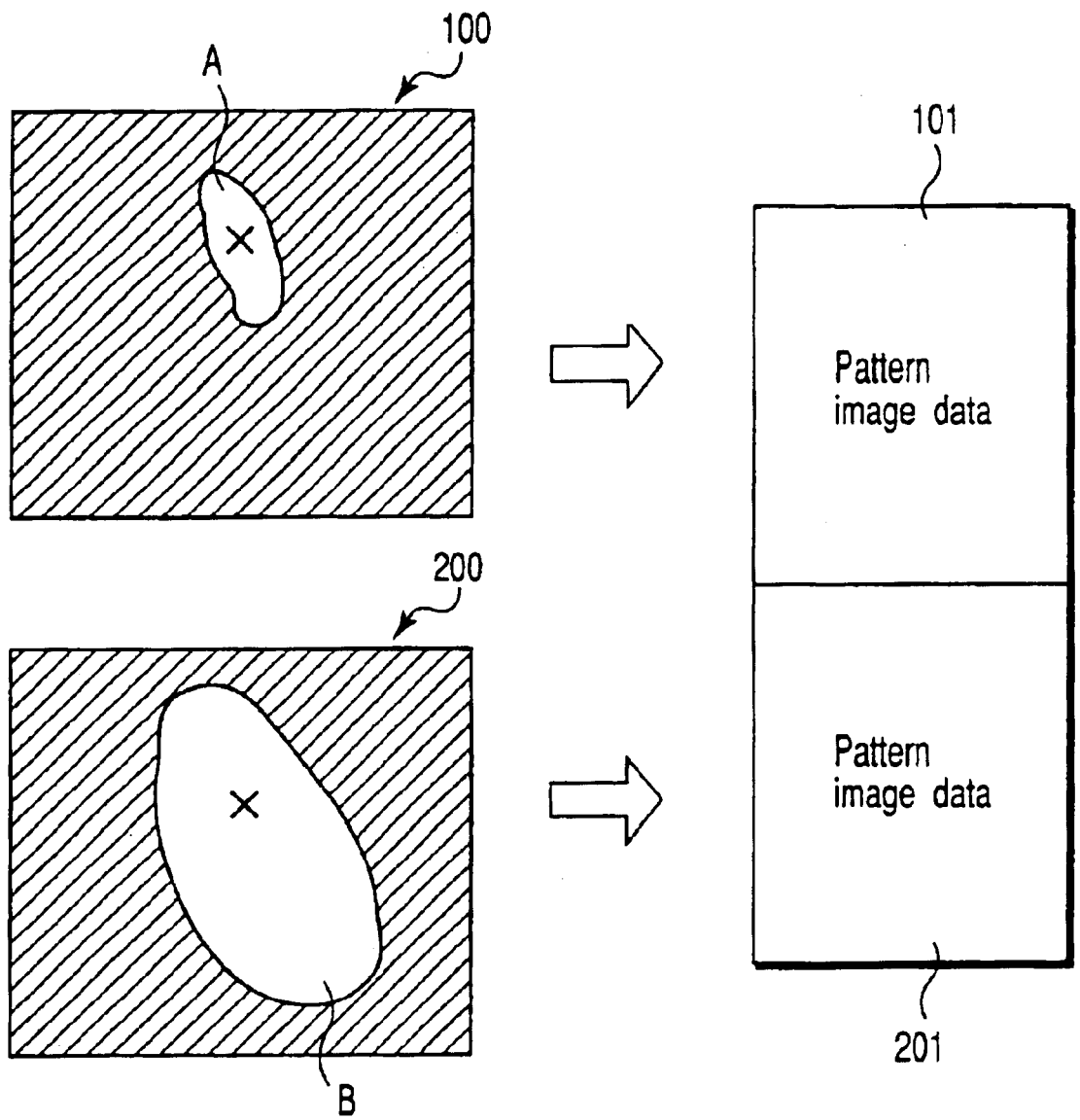
FIG. 4 is an illustration showing laser irradiation region pattern images and pattern image data according to the embodiment of the present invention.

The data processing unit 5 forms a laser irradiation region pattern image 100 as a control pattern as shown in FIG. 4 on the basis of the designated laser irradiation region A. This laser irradiation region pattern image 100 has pixels the number of which is equal to the number of pixels on the display unit 6 shown in FIG. 3. Modulation information such as an irradiation intensity of a laser beam can be set for each pixel. In the laser irradiation region pattern image 100, the irradiation intensity of the laser beam of each pixel of a portion surrounded by the laser irradiation region A is "strong", and the laser beam is set to be cut in each pixel of the other region. The laser irradiation region pattern image 100 is transferred from the data processing unit 5 to the control circuit 44 through the interface unit 41 as pattern image data 101 shown in FIG. 4 together with the modulation information of the laser beams of the respective pixels and stored in the pattern storage memory 44a.

While the operator watches the scanning image displayed on the display unit 6 shown in FIG. 3, the operator designates a laser irradiation region B on the image by using the mouse and the like of the input unit 7.

The data processing unit 5 forms the laser irradiation region pattern image 200 as a control pattern as shown in FIG. 4 on the basis of the designated laser irradiation region B. In the laser irradiation region pattern image 200, the irradiation intensity of the laser beam of each pixel of a portion surrounded by the laser irradiation region B is "weak", and a laser beam is set to be cut in each pixel of the other region. The laser irradiation region pattern image 200 is also transferred from the data processing unit 5 to the control circuit 44 through the interface unit 41 as pattern image data 201 shown in FIG. 4 together with the modulation information of the laser beams of the respective pixels and stored in the pattern storage memory 44a.

In this manner, the pattern image data 101 and 201 of the plurality (two in FIG. 4) of laser irradiation region pattern images 100 and 200 are stored in the pattern storage memory 44a.

A method of acquiring a scanning image of the sample 33 by using the laser irradiation region pattern images 100 and 200 described above will be described below.

While the operator watches the scanning image displayed on the display unit 6 shown in FIG. 3 before scanning is started, the operator uses the mouse and the like of the input unit 7 to instruct that the pattern image data 101 is used first. When the memory control circuit 44b receives the instruction from the input unit 7 through the data processing unit 5 and the interface unit 41, the region of the pattern storage memory 44a in which the pattern image data 101 is stored is set.

In this state, when the scanner drive circuit 42 drives the scanning mechanism 24 and starts scanning, the pattern image data 101 of the pattern storage memory 44a is read pixel by pixel in synchronism with a synchronous signal from the synchronous signal generation circuit 46 to be output to the D/A converter 44c. At this time, the pattern image data 101 for each pixel is converted into an analog signal by the D/A converter 44c and output to the high-frequency driver circuit 43 as the intensity modulation signal of the laser beam through the buffer amplifier 44d. When the high-frequency driver circuit 43 drives the AOTF 14 by the input intensity modulation signal, the intensity of the laser beam is modulated by the AOTF 14. Otherwise, in a case of changing the wavelength of the laser beams emitted to the sample 33, the electric part control circuit 45 opens or closes the laser shutters 12a, 12b, 12c, and 22 to output a laser light having a desired wavelength.

In this case, since the pattern image data 101 corresponds to the laser irradiation region pattern image 100, as shown in FIG. 4, an irradiation intensity is "strong" with respect to only the laser beams of the respective pixels of the portion surrounded by the laser irradiation region A, and the laser beam of each pixel of the other region is cut.

In this case, a finite period of delay time exists between the output of a drive signal to the AOTF 14 by the high-frequency driver circuit 43 and the output of the laser beam from the AOTF 14. In fact, in the memory control circuit 44b, until reading of the pattern image data 101 in the pattern storage memory 44a is started after a synchronous signal is input, an appropriate period of delay time is desirably set.

In this manner, after scanning is performed by using the laser irradiation region pattern image 100 for a desired period of time, while the operator watches a scanning image displayed on the display unit 6 shown in FIG. 3, the operator uses the mouse or the like of the input unit 7 to instruct that the next pattern image data 201 is used. When the memory control circuit 44b receives the instruction from the input unit 7 through the data processing unit 5 and the interface unit 41, a region of the pattern storage memory 44a in which the pattern image data 201 is stored is set.

In this state, when the scanner drive circuit 42 drives the scanning mechanism 24 and starts scanning, the pattern image data 201 of the pattern storage memory 44a is read pixel by pixel in synchronism with a synchronous signal from the synchronous signal generation circuit 46 to be output to the D/A converter 44c. At this time, the pattern image data 201 is converted into an analog signal by the D/A converter 44c and output to the high-frequency driver circuit 43 as the intensity modulation signal of the laser beam through the buffer amplifier 44d. When the high-frequency driver circuit 43 drives the AOTF 14 by the input intensity modulation signal, the intensity of the laser beam is modulated by the AOTF 14. Otherwise, in a case of changing the wavelength of the laser beams emitted to the sample 33, the electric part control circuit 45 opens or closes the laser shutters 12a, 12b, 12c, and 22 to output a laser light having a desired wavelength.

In this case, since the pattern image data 201 corresponds to the laser irradiation region pattern image 200, as shown in FIG. 4, an irradiation intensity is "weak" with respect to only the laser beams of the respective pixels of the portion surrounded by the laser irradiation region B, and the laser beam of each pixel of the other region is cut.

Figure 5:
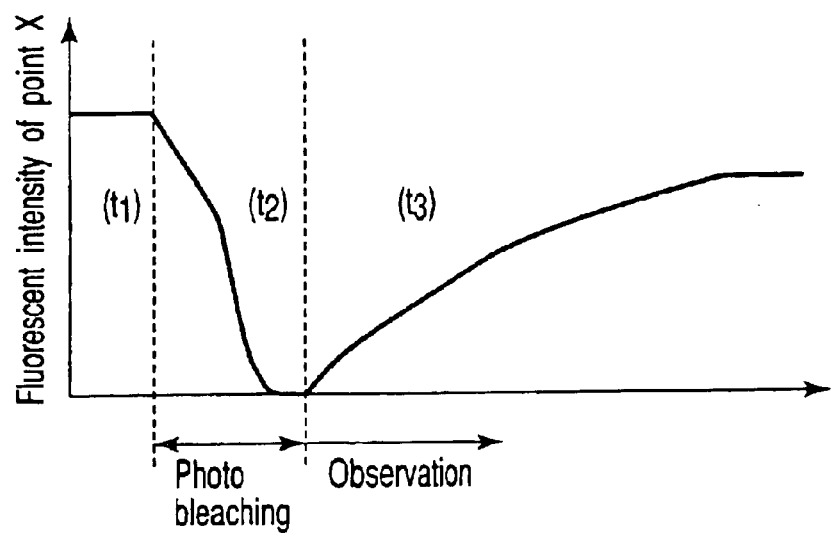
FIG. 5 is a graph showing the state of a change in the intensity of fluorescence light according to the embodiment of the present invention.

FIG. 5 is a graph showing the state of a change in the intensity of fluorescence light according to the first embodiment of the present invention. The intensity of fluorescence light at a common laser irradiation point X of the laser irradiation region pattern images 100 and 200 changes as shown in FIG. 5. A period t1 represents a change in intensity of fluorescence light in the initial state of the sample 33. In a period t2, a strong laser beam is irradiated on a portion around the laser irradiation point X on the basis of the laser irradiation region pattern image 100. In this manner, the fluorescent material in the sample 33 is bleached, and the intensity of fluorescence light is sharply decreased. Thereafter, the laser irradiation region pattern image 100 is controlled at an arbitrary timing to be changed into the laser irradiation region pattern image 200. In a period t3, a weak laser beam is irradiated on the portion around the laser irradiation point X where the fluorescent material is bleached on the basis of the laser irradiation region pattern image 200. In this manner, in a range including the portion around the region in which the fluorescent material is bleached, the process of recovering the intensity of the fluorescence light can be observed.

According to the first embodiment, scanning images corresponding to the different laser irradiation region pattern images 100 and 200 can be obtained with the lapse of time. In this manner, the following dynamic measurement with the passage of time can be realized. A specific portion of the sample 33 is bleached by a strong laser beam, and, thereafter, the degree of recovery of the bleached fluorescent material is measured while irradiating a weak laser beam.

The first embodiment describes the case in which the two laser irradiation region pattern images 100 and 200 are used. However, three or more laser irradiation region patterns can also be used.

In the first embodiment, the setting of the intensity of irradiation of a laser beam is performed for each pixel. However, when the number of pixels of a scanning image is set as, e.g., 512 pixels×512 pixels, and when a D/A converter having a resolution of 8 bits is used as the D/A converter 44c, the memory capacity required to store one pattern image data is 256 k bytes. For this reason, when the number of laser irradiation region pattern images increases from several to several tens, when a scanning image is to be obtained while increasing the number of laser irradiation region pattern images, the total capacity of the pattern storage memory 44a for storing pattern image data corresponding to the laser irradiation region pattern images is several megabytes to several ten megabytes. This total capacity is not practical.

Figure 6:
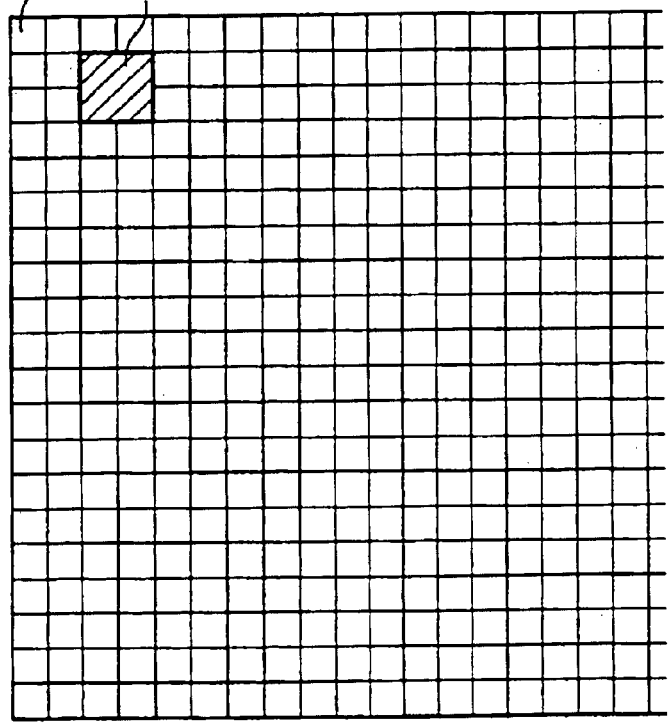
FIG. 6 is a diagram showing a pixel setting of a pattern image data according to the embodiment of the present invention.

Therefore, in the second embodiment, the number of pixels of a scanning image 51 is given by 512 pixels×512 pixels as shown in FIG. 6, and one pixel of the pattern image data is set every 2×2 pixels, so that a capacity required in the pattern storage memory 44a is reduced to ¼.

As described above, according to the second embodiment, since the number of pixels of the pattern image data can be reduced with reference to the number of pixels of the scanning image, a large number of laser irradiation region pattern images can be stored in the pattern storage memory 44a although the total capacity of the pattern storage memory 44a is small.

The present invention is not limited to the embodiments. Various modifications can be properly achieved without departing from the spirit and the scope of the invention. For example, in the above embodiments, in the laser device 1, the common AOTF 14 is arranged to the plurality of laser resonators 11a, 11b, and 11c. However, in addition to these laser oscillators, a laser oscillator for generating a UV laser and an AOTF for UV laser may be used. In this case, when the AOTF for UV laser is independently controlled, after caged ions in the sample 33 are canceled, measurement or the like of an ion concentration can also be performed.

As has been described above, according to the present invention, for example, there can be provided a scanning laser microscope which can cope with a dynamic measurement with the passage of time in which a specific portion of a sample is bleached in an arbitrary shape, and the process of restoring the bleached region of fluorescence light is measured immediately after the bleaching. In addition, scanning images corresponding to different laser irradiation region pattern images can be obtained with the lapse of time without stopping scanning. Even a memory having a small capacity can store a large number of laser irradiation region pattern images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser scanning method of a scanning laser microscope which obtains a scanning image of a sample, the method comprising:

storing a plurality of control patterns having modulation information of a laser beam corresponding to pixels of a scanning image;

reading one of the control patterns and scanning while modulating the laser beam on the basis of the modulation information of the laser beam included in said one of the control patterns; and changing said one of the control patterns to another pattern at an arbitrary timing and scanning while modulating the laser beam on the basis of the modulation information of the laser beam included in said another pattern.

* * * * *